United States Patent
Abbott et al.

(10) Patent No.: US 6,506,326 B1
(45) Date of Patent: Jan. 14, 2003

(54) METHOD FOR FABRICATING COMPOSITE PARTS BY INJECTION MOLDING

(75) Inventors: Richard C. Abbott, Gardner, MA (US); William A. Glenn, Groton, MA (US)

(73) Assignee: ThermoCeramix, Inc., Shirley, MA (US)

( * ) Notice: Subject to any disclaimer, the term of this patent is extended or adjusted under 35 U.S.C. 154(b) by 47 days.

(21) Appl. No.: 09/711,388

(22) Filed: Nov. 14, 2000

(51) Int. Cl.[7] .................. B29C 41/20; B29C 41/22; B29C 45/14; B29C 45/16; B29C 70/88

(52) U.S. Cl. .................. 264/104; 264/254; 264/255; 264/309

(58) Field of Search .................. 264/104, 105, 264/250, 255, 254, 309, 328.7, 328.8

(56) References Cited

U.S. PATENT DOCUMENTS

| | | | |
|---|---|---|---|
| 3,816,837 A | * 6/1974 | Smith | 264/104 |
| 3,889,363 A | * 6/1975 | Davis | 264/255 |
| 4,562,025 A | * 12/1985 | Gray | 264/126 |
| 4,629,595 A | * 12/1986 | Ito | 264/105 |
| 4,681,712 A | * 7/1987 | Sakakibara et al. | 264/328.7 |
| 5,145,710 A | 9/1992 | Quadflieg et al. | |
| 5,333,379 A | * 8/1994 | Odaira et al. | 264/263 |
| 5,559,677 A | 9/1996 | Errichiello | |
| 6,024,904 A | * 2/2000 | Nanri | 264/251 |
| 6,202,276 B1 | 3/2001 | Chuang | |
| 6,261,499 B1 | * 7/2001 | Okeke et al. | 264/264 |

FOREIGN PATENT DOCUMENTS

| | | |
|---|---|---|
| JP | 62-275724 | 11/1987 |
| JP | 62-275725 | 11/1987 |
| JP | 62-275726 | 11/1987 |
| JP | 62-275727 | 11/1987 |
| JP | 62-276896 | 12/1987 |

* cited by examiner

*Primary Examiner*—Angela Ortiz

(57) ABSTRACT

A method which forms a part by molding and applies a coating by thermal spray in one operation, thereby reducing the time to make the composite part and extending the physical properties of the part. A molding machine (56) is coupled with a thermal spray system (24) so that a mold cavity (16) may be coated while the separable mold (10) is apart. The sprayed coating (28) may be any material suitable for thermal spray. The sprayed coating (28) is deposited with low bond strength to the mold and a high surface roughness for adhesion to the material being molded. After the thermal spray system (24) and mask (30) are retracted, the mold components are assembled and the molding material is introduced into the mold as in conventional molding. After solidication of the molding material, the part is ejected from the mold as a composite, consisting of a low melting point material bonded to a coating of either high or low melting point.

11 Claims, 6 Drawing Sheets

METHOD FOR FABRICATING COMPOSITE PARTS BY INJECTION MOLDING

BACKGROUND OF THE INVENTION

This invention relates to the field of the coating of molded parts, specifically, applying the coatings during the molding process.

Plastics are used widely as enclosures and other mechanical parts because they are inexpensive to make, usually by injection molding and because they possess other desirable physical properties such as light weight, pleasing appearance, sufficient mechanical strength and stiffness, and chemical inertness. However, there are other physical properties that plastics do not normally have that often are required for some particular engineering application. For example, plastic enclosures need to be electrically conductive when there is a requirement for electromagnetic interference shielding. Other applications need hard, abrasion resistant wear surfaces; and yet other plastics require thermal insulation for protection against exposure to high temperatures.

When molded plastic components do need to be modified such as, for example, the addition of an electrically conductive element by thermal spray or painting, it is frequently a secondary operation done more often than not at another location by another manufacturer with a different expertise. This greatly increase the cost of manufacturing the part. Examples of secondary coating operations include sputtering, evaporation, painting, attachment of layers by gluing, screen printing, or thermal spray.

Thermal spray is a versatile and powerful method for applying coatings of metals, ceramics, or cermets to materials in order to modify their physical properties. For example, the surface of a soft aluminum component may be made extremely hard and abrasion resistant by the thermal spray application of tungsten carbide. Or, the surface of an electrically insulating part may be thermally sprayed with copper to make it highly conductive.

Thermal spray technology is a coating technology. It includes systems that use powder as feedstock such as arc plasma, flame spray, and high velocity oxy-fuel (HVOF) systems, or which use wire as feedstock such as arc wire, HVOF wire, and flame spray. Together, these systems comprise a highly versatile technology capable of depositing coatings of nearly any material that melts, be it metal, ceramic, or cermet. They all function by melting the feedstock into tiny droplets, accelerating the droplets in a carrier gas, and depositing the droplets onto a suitably prepared surface. The droplets freeze instantaneously on the surface and build up a thick layer as the thermal spray system is repeatedly traversed across the coated area.

The universal drawback of thermal spray is that a prodigious quantity of heat is involved in the deposition of a coating so that it is very difficult to coat materials that have a low melting point, particularly if they have thin walls. In general, only low melting point materials, such as zinc, tin, or aluminum, can be easily sprayed on low melting point materials, such as plastic. It is very difficult to deposit, for example, aluminum oxide, which is a ceramic with a melting temperature of 205° C., onto PC/ABS, which is a plastic that softens below 200° C. Thermal spray is most effective when the substrate accepting the coating is made of a material with sufficient mass to absorb the heat and sufficiently high melting point so as not to degrade either itself or the coating.

Therefore, there is a need for improved methods for applying coatings to molded parts.

SUMMARY OF THE INVENTION

The invention features methods by which to produce molded plastic or metal parts, which have a desired surface coating that otherwise would require a secondary operation to apply. These methods greatly reduce the manufacturing time and expense because, typically, coatings are applied to molded parts at different facilities using different equipment. In the present methods, a coating, e.g., a high temperature coating, is first applied to a mold and then transferred to the molded part, e.g., at low temperature. The methods described herein greatly enhance the use of low melting point molded parts, such as plastics, by offering the ability to apply engineering coatings, e.g., hard ceramics or high-melting metals, that ordinarily require the parts to be able to withstand high temperatures. In addition, the present methods provide a means of modifying the physical surface properties of a molded part, e.g., giving a very hard surface to a plastic part in order to enhance its engineering properties.

Accordingly, in a first aspect, the invention features a method for fabricating a composite part. The method includes the steps of providing a mold including separable components that define a cavity, wherein the cavity is shaped to form the composite part; separating the components and positioning a mask in front of a surface of the cavity; depositing a coating, e.g., a hard cermet, metal, or ceramic, on the cavity surface, wherein the mask defines an area of the surface to be coated; removing the mask and assembling the components in preparation for molding; and supplying moldable material, e.g., plastic or metal, to the cavity and allowing the material to solidify, wherein when the material solidifies, it adheres to the deposited layer to form the composite part. In various embodiments, the method further includes the step of removing the composite part from the mold. In other embodiments, the coating includes two or more layers of metal, cermet, or ceramic.

An exemplary composite part is a wireless telephone enclosure. In this embodiment, the deposited layer is, for example, an EMI/RFI coating, e.g., one including zinc. In other embodiments, the composite part includes an electrically resistive heater. Desirably, the electrically resistive heater includes an electrically insulating layer, e.g., one containing aluminum oxide, and a layer having a formulated resistivity, e.g., one containing molybdenum silicide. In other embodiments, the heater includes nickel-chrome.

The foregoing and other objects, features, and advantages of the invention will be apparent from the following detailed description of the invention and the accompanying drawings.

BRIEF DESCRIPTION OF THE DRAWINGS

Like reference characters refer to the same parts throughout the different views. The drawings are not necessarily to scale, emphasis instead being placed upon the principles of the invention.

Figure 1:
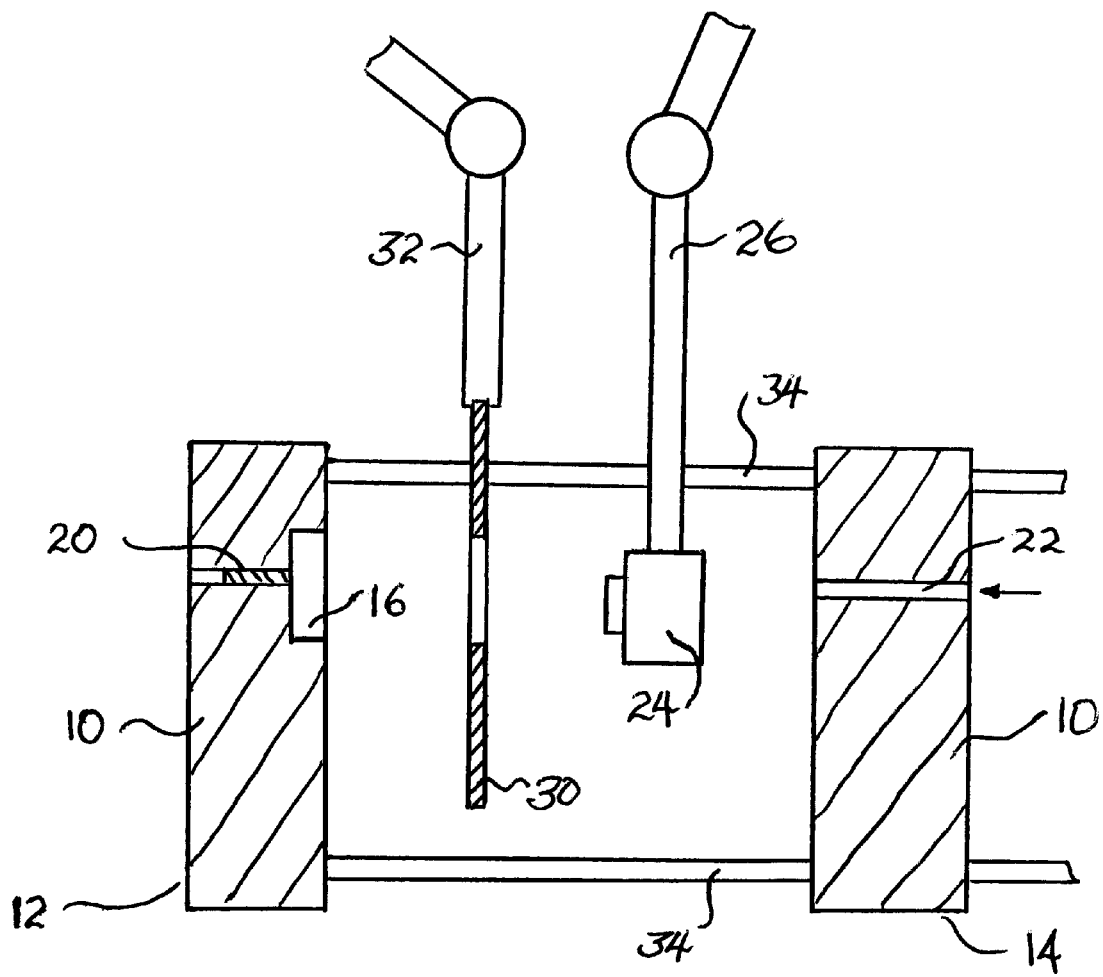
FIG. 1 is a view of a system for fabricating composite parts by injection molding in accordance with the present invention. In this configuration, the molds are mounted horizontally with one half fixed and the other half retractable.

REFERENCE NUMERALS 10 mold
12 left half
14 right half
16 cavity
18 part
20 ejector pin
22 runner
24 thermal spray system
26 positioning system
28 sprayed coating
30 mask
32 positioner
34 rails
36 mask positioning
38 mold release
40 coating deposition
42 mask removal
44 thermal spray system removal
46 mold closing
48 plastic injection
50 mold retraction
52 part ejection
54 mold cleaning
56 plastic injection molding machine

DETAILED DESCRIPTION OF THE INVENTION

The present invention brings together the capability of thermal spray technology to deposit virtually any material as a coating to modify or enhance physical properties and the capability of injection molding to produce shaped plastic or metal parts quickly and inexpensively. Thermal spray is used to apply a coating to the mold rather than the part. The part is then molded in the customary way by injection of molten material into the coated mold. When the solidified part is subsequently ejected, it emerges from the mold bonded to the coating.

The present invention addresses both the problem of coating molded parts in a secondary operation and the problem of extending the usefulness of molded parts with low melting temperatures by applying a high performance coating to the mold, which is often stell or some other material capable of withstanding high temperature, used for molding the part and transferring that coating to the part itself during the molding operating.

Thermal spray can be used to deposit a wide variety of coatings to steel surfaces or other surfaces of materials capable of withstanding high temperatures. In addition, the coatings can be made to adhere with either high or low bond strengths and with either smooth or rough as-deposited surfaces.

For depositing coatings in a manufacturing environment such as an injection molding machine, the thermal spray apparatus possesses a spray head of sufficiently small dimensions that allow it to fit between the separated halves of a mold for application of the coatings. Moreover, the deposition rates for thermal spray can reach over 10 kg per hour, for some metals. These properties of thermal spray make it possible to couple this technology to molding technology to effect the concurrent coating of high performance materials and molding of parts.

A preferred embodiment uses a plastic injection molding machine, either vertical or horizontal, with a conventional mold set consisting of a fixed component and one or more movable components. A thermal spray apparatus mounted on a holding fixture is used to deposit a coating on one of the molds such that the coating adheres to the mold with a low bond strength, in the range of 5–1000 psi. The coating is deposited on the mold preferably while it is mounted in the molding machine in its retracted position. The space between the molds should be grater than the size of the spray gun plus the required spray distance, about 8" minimum. It may also be deposited on the mold through a mask that is superimposed over the mold so that only desired areas are coated. After the thermal spray apparatus had deposited the coating, it is retracted by means of its holding fixture from the space between the separate mold parts. The mask is also retracted from the front of the mold at this time. The two or more portions of the mold are driven together through the normal action of the injection molding machine, and the plastic is injected into the mold.

When the hot, molten plastic or metal is injected under pressure into the mold, it encounters the rough surface of the thermally sprayed coating and bonds to it. It solidifies in the normal way as it encounters the chilled walls of the mold and the coating attached to the mold. When the plastic or metal solidifies, it shrinks away from the mold walls taking with it the lightly attached coating. The result is a molded plastic or metal part with an integral coating molded into it.

The system and method of the present invention can be used with all types of molding machines and apparatus, in particular injection molding apparatus.

Some examples of the products that result from the method of the present invention are as follows:

a. a plastic wireless telephone housing with a zinc EMI/RFI shielding coating.

b. a plastic mechanical part with a molded tungsten carbide coating for extreme wear resistance.

c. a plastic X-ray machine part with a molded tungsten radiation shield.

d. a plastic underhood automotive part with a molded aluminum thermal radiation shield.

e. a plastic part with an integral nickel-chrome heater coating.

f. a plastic part with a multilayer coating consisting of an aluminum oxide insulator and molybdenum silicide heater with formulated resistivity.

g. a plastic textile machinery part with a titania/alumina ceramic coating for wear resistance and lubricity.

h. a plastic part intended for exposure to high temperature with a molded coating of zirconium oxide as a thermal shield.

i. a plastic part with a decorative coating of colored ceramic or metal.

j. a magnesium part with an aluminum oxide electrical insulator coating.

k. a die cast zinc part with a tungsten carbide coating for wear and erosion resistance.

EXAMPLE 1
Structure of a Mold

FIG. 1 is a view of a system for fabricating composite parts by plastic injection molding in accordance with the present invention. In this configuration, which is a conventional plastic injection molding machine 56 arrangement, the mold 10 consists of two parts, the left half 12 and the right half 14. In this figure, the left half 12 is stationary, and the right half 14 is able to retract horizontally along rails 34. The mold 10 is depicted in the retracted position. The left half 12 of the mold 10 has a cavity 16 into which plastic is injected to form the part 18. The left half 12 also contains at least one ejector pin 20 which is used to push the molded plastic part out of the mold 10 after molding. The ejector pin 20 is shown in its retracted position in the left half 12. The molten plastic material is introduced to the cavity 16 during the molding process by means of the runner 22, located in the right half 14. The runner 22 can also be located in the stationary half of the mold 10. The thermal spray system 24 is shown in this figure positioned between the mold left half 1 and mold right half 14. It is mounted to a positioning system 26, such as a multi-axis robot, that can insert the thermal spray system 24 between the halves of the mold 10 or withdraw it to allow the left half 12 and the right half 14 to come together. The positioning system 26 can also manipulate the thermal spray system 24 so that the sprayed coating 28 can be deposited in a manner such that it has the desired thickness and desired location in the cavity 16. The positioning system 26 should be capable of moving the spray system, weighing approximately 10 kg at a rate of up to 800 mm/sec. A movable mask 30 is positioned in front of the left half 12 and the thermal spray system 24 so that the coating is deposited in the desired areas. Like the thermal spray system 24, the mask 30 is affixed to a positioner 32 which can insert the mask 30 when the mold 10 is retracted and the coating process is taking place or can remove the mask 30 after the coating has been deposited and the mold halves are brought together for molding. It too should be capable of translating the mask at a speed of up to 800 mm/sec. The mask 30 should be constructed to fit tightly against the cavity 16 and be made of preferably metal coated with silicone or polyurethane.

EXAMPLE 2
Structure of a Composite Part

Figure 2A:
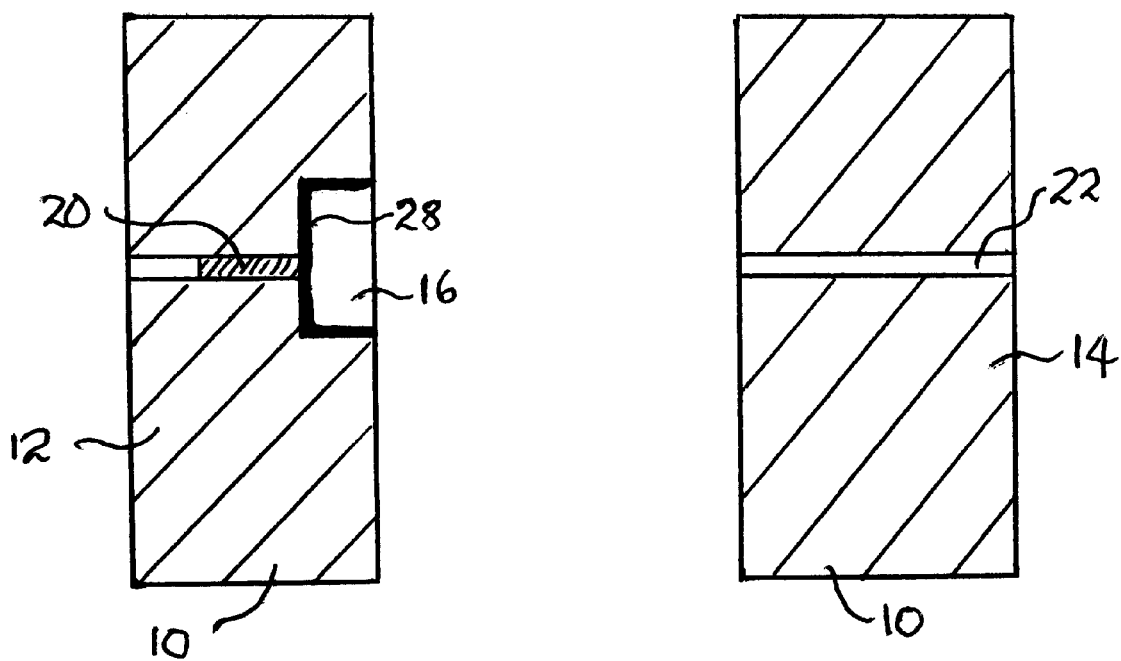
FIG. 2A is a cross section of a steel mold prior to plastic injection. A coating has been applied to the mold cavity. The mold halves are separated in the retracted state.
Figure 2B:
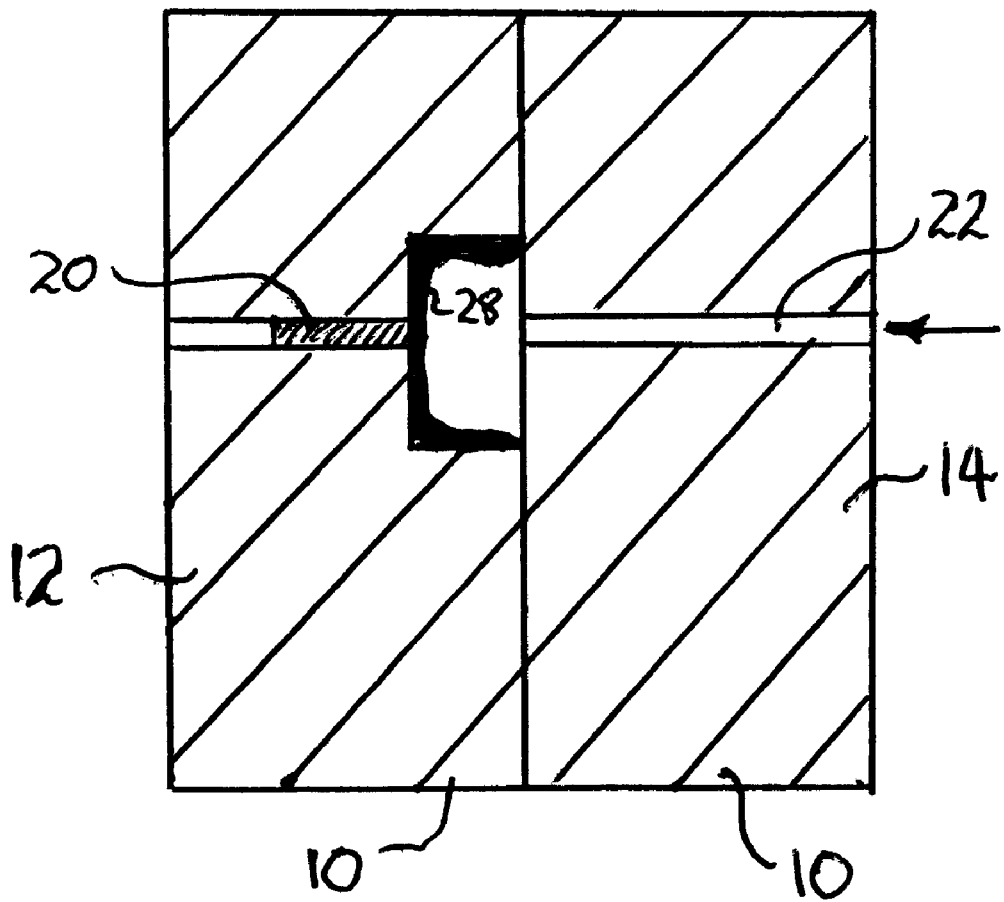
FIG. 2B is a cross section of the mold ready for plastic injection. The mold halves are mated to form a closed cavity for forming the part.
Figure 2C:
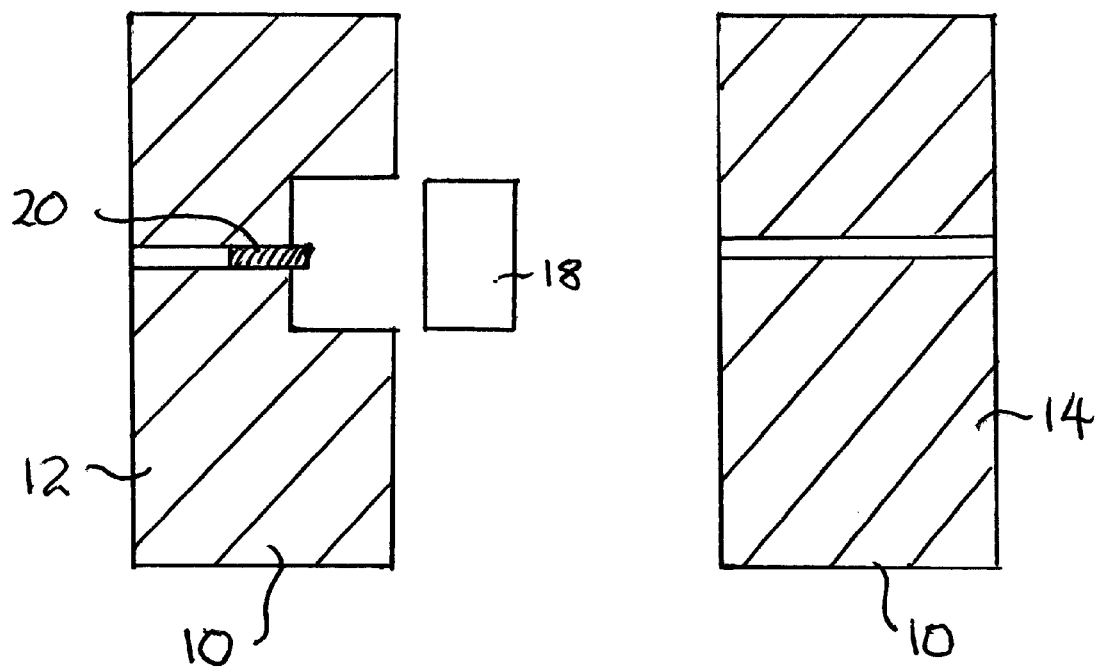
FIG. 2C is a cross section of a mold after the part has been molded. After injection of the plastic, the mold halves separate, and the ejector pin pushes the plastic part out of the mold.
Figure 2D:
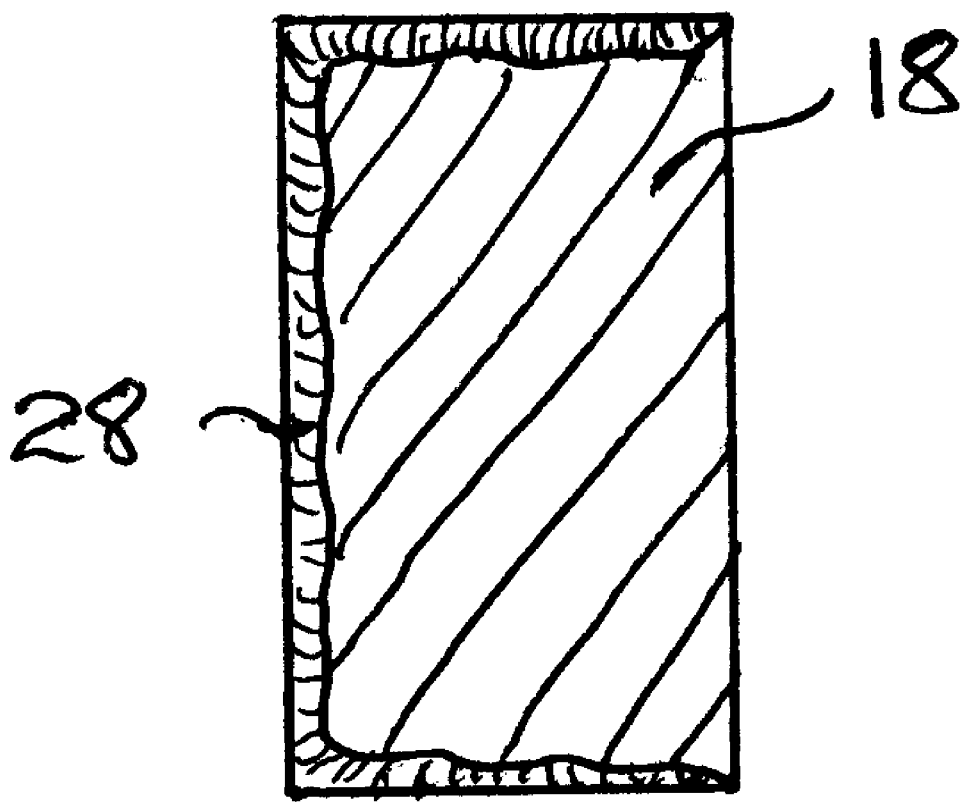
FIG. 2D is a cross section of a molded plastic part with its coating after ejection from the mold.

FIG. 2A is a cross section of a steel mold 10 prior to plastic injection. A sprayed coating 28 is shown to have been applied to the cavity 16 of the left half 12. The mold halves are shown in their retracted position. FIG. 2B is a cross section of the mold 10 with the left half 12 and the right half 14 of the molds in position for injection of the plastic. The cavity 16 is now closed ready to receive molten plastic from the runner 22. FIG. 2C is a cross section of the mold 10 after the plastic has been injected in the cavity 16 and solidified. The left half 12 and right half 14 are separated and the ejector pin 20 is pushing the part 18 out of the mold 10. FIG. 2D is a cross section of the part 18 consisting of a sprayed coating 28 and molded plastic component.

EXAMPLE 3
Operation

Figure 3:
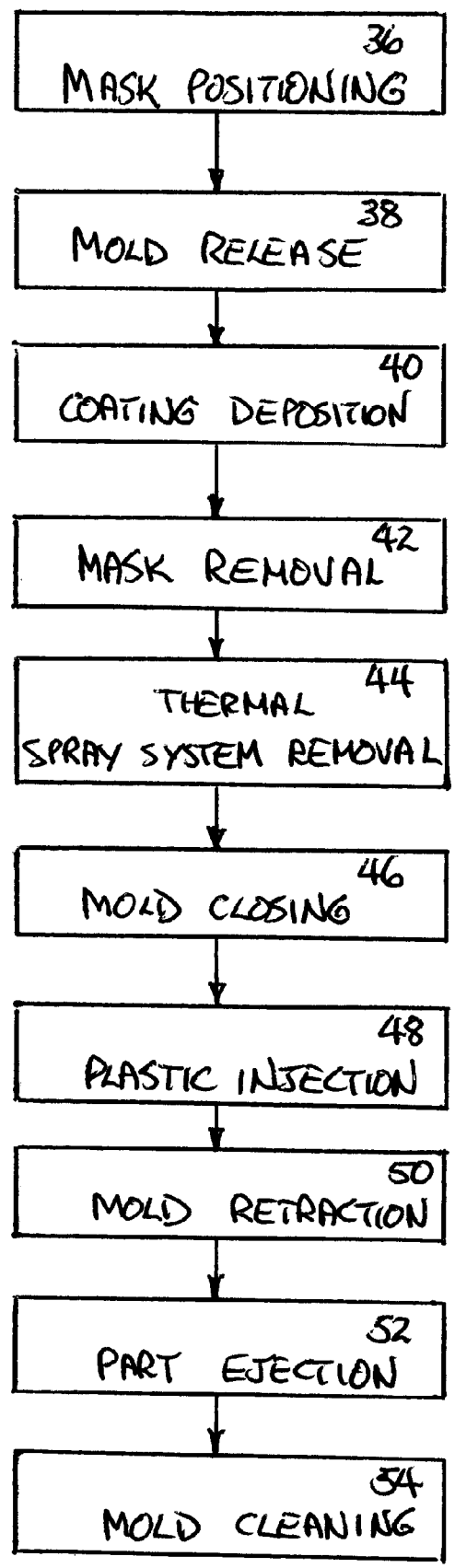
FIG. 3 is a flow chart illustrating a preferred embodiment of the process of the present invention.

FIG. 3 is a flow chart illustrating the operation of a preferred embodiment of the process using the apparatus described above in Examples 1 and 2. The first step of the molding cycle begins with the mold 10 in the separated (retracted) position. This step is mask positioning 36. When the mask is in place, it may be necessary to apply a mold release 38 step using an automated spray gun or simply a nozzle directed at the mold 10. Next, the positioning system 26 with the thermal spray system 24 attached is inserted between the mold halves for the coating deposition 40 step. After the coating has been deposited to a sufficient thickness, the mask removal 42 and thermal spray system removal 44 steps are performed. Then the mold closing 46 takes place in preparation for injecting the molten plastic in step 48. After the part is molded, the mold halves are parted in the mold retraction 50 step, whereupon the part ejection 52 step removes the part from the mold. Finally, a mold cleaning 54 step may be necessary, in which compressed air or glass beads are directed at the mold cavity to remove stray particles of sprayed material.

Other Embodiments

Although the description above contains many specific embodiments, these embodiments should not be construed as limiting the scope of the invention but as merely providing illustrations of some of the presently preferred embodiments of this invention. Various other embodiments and ramifications are possible within the scope of the invention. For example, molding processes other than injection molding may be utilized, such as die-casting, semi-solid forming, and thixotropic casting.

Other embodiments are within the claims.

What is claimed is:

1. A method for fabricating a composite wireless telephone enclosure, said method comprising the steps of:

(a) providing a mold comprising separable components that define a cavity, wherein said cavity is shaped to form said composite wireless telephone enclosure;

(b) separating said components and positioning a mask in front of a surface of said cavity;

(c) depositing a metallic or ceramic layer on said cavity surface, wherein said mask defines an area of said surface to be coated;

(d) removing said mask and assembling said components in preparation for molding; and (e) supplying moldable material to said cavity and allowing said material to solidify, wherein when said material solidifies, it adheres to the layer of step (c) to form said composite wireless telephone enclosure.

2. A method for fabricating a composite part, said method comprising the steps of:

(a) providing a mold comprising separable components that define a cavity, wherein said cavity is shaped to form said composite part;

(b) separating said components and positioning a mask in front of a surface of said cavity;

(c) depositing an electrically resistive heater on said cavity surface, wherein said mask defines an area of said surface to be coated;

(d) removing said mask and assembling said components in preparation for molding; and (e) supplying moldable material to said cavity and allowing said material to solidify, wherein when said material solidifies, it adheres to the heater of step (c) to form said composite part.

3. The method of claim 1, wherein said layer of step (c) is an EMI/RFI coating.

4. The method of claim 3, wherein said layer comprises zinc.

5. The method of claim 1, further comprising the step of (f) removing said composite wireless telephone enclosure from said mold.

6. The method of claim 2, furthering comprising the step of (f) removing said composite part from said mold.

7. The method of claim 2, wherein said electrically resistive heater comprises an electrically insulating layer and a layer having a formulated resistivity.

8. The method of claim 7, wherein said electrically insulating layer comprises aluminum oxide.

9. The method of claim 7, wherein said layer having a formulated resistivity comprises molybdenum silicide.

10. The method of claim 2, wherein said electrically resistive heater comprises nickel-chrome.

11. The method of claim 1, wherein said moldable material in step (e) is plastic or metal.

* * * * *